April 27, 1948.  R. S. AMES ET AL  2,440,499
APPARATUS FOR FREE-BLOWING THERMOPLASTIC MATERIAL
Filed April 26, 1945   2 Sheets-Sheet 1

Inventor
Robert S. Ames
Robert W. McCullough
Mauritz P. H. Peterson

Inventor
Robert S. Ames
Robert W. McCullough
Mauritz P. H. Peterson

Patented Apr. 27, 1948

2,440,499

UNITED STATES PATENT OFFICE 2,440,499

APPARATUS FOR FREE-BLOWING THERMOPLASTIC MATERIAL

Robert S. Ames, Robert W. McCullough, and Mauritz P. H. Peterson, Akron, Ohio, assignors to Goodyear Aircraft Corporation, Akron, Ohio, a corporation of Delaware Application April 26, 1945, Serial No. 590,478

4 Claims. (Cl. 18—19)

1

This invention relates to jigs for forming thermoplastics especially methyl methacrylate, and in particular to jigs, and apparatus adapted for free blowing of flat sheets into bubbles for airplane canopies and similar purposes.

Prior to this invention, jigs for these purposes which are usually operated by air pressure of vacuum did not give quite satisfactory results, in so far as the desired contours and the optical properties of the article were concerned. Those jigs, made to the exact dimensions of the base of the article did not produce, when pressure or vacuum was applied, a fully corresponding curvature on the finished product. That was due to the fact that the sheet, where not restrained in the jig, expanded a little over the jig contour and caused to form cheeks or bulges along the edges. Such cheeks or bulges were particularly pronounced and undesirable at the front edge of the bubble where it is most essential that a perfect streamline connection with the canopy wind screen be obtained. On the other hand, at the narrow rear end it occurred that the sheet, due to its relative stiffness did not quite expand in prior practices to a full half circle in cross section as expected, and, therefore, the longitudinal contour at this end was insufficiently developed to provide an exact or a good streamline fit with its counterpart. The present invention, however, is not intended to form a bubble having a closed rear end, but one which is open and arch-shaped. In many cases this construction is not adopted by choice but by necessity, because plastic sheets on the market are obtainable only in a certain maximum length insufficient for streamlining extra length of a cockpit. The rear end of the bubble, in these cases, usually is then supplemented by a separate closure made of metal.

It is the object of the invention to avoid and overcome the foregoing and other difficulties of and objections to prior art practices by the provision of an improved jig and forming apparatus by which a bubble can be blown to a desired contour without undesired cheeking and bulging except trimming the edges.

Another object of this invention is to obtain a clear and optically perfect bubble without leaving marks due to forming.

Another object of the invention is to eliminate unsatisfactory workmanship and to reduce production cost.

The aforesaid objects of the invention and other objects which will become apparent as the description proceeds are achieved by providing

2 a jig which extends at both ends a sufficient distance beyond the finished length of the article to be blown so that the clamped edges of the sheet at the ends of the bubble where cheeking or bulging occurs is spaced from the finished dimension lines.

For a better understanding of the invention, reference should now be had to the accompanying drawings, wherein Figure 1 is a plan view of the jig showing one half of the pressure lid and the bubble removed.

Figure 1:
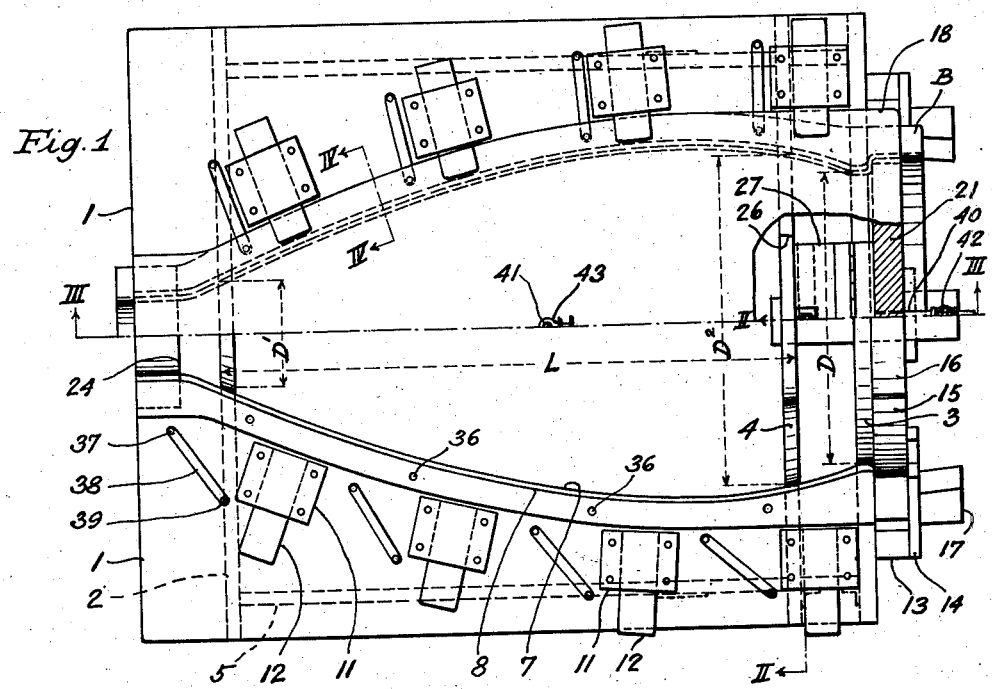
Figure 2:
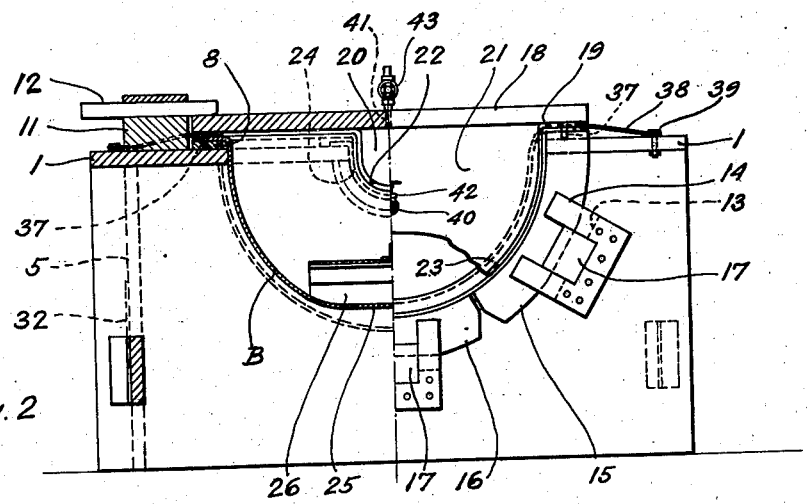
Figure 2 is a half cross-sectional elevational view taken on line II—II, and a half elevational end view of Figure 1.
Figure 4:
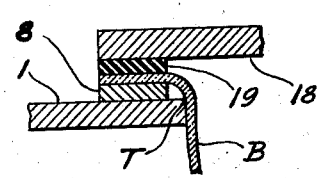
Figure 4 is a cross-sectional view of a detail taken on line IV—IV of Figure 1.

With specific reference to the form of the invention illustrated in the drawing, the numeral 1 indicates the jig plate, consisting of a right and left part, which are supported by end walls 2, 3 and 4, and by side walls 5. The end walls 2 and 4 function as gauge members and are set apart from each other the distance L between their outer faces which is the finished length, plus an allowance for shrinkage in cooling, of the bubble to be blown. The inner contours 7 of the jig plates 1 conform within the length L exactly to the longitudinal shape of the finished bubble of substantially half round cross section. Liners 8 by which the plastic sheet B is supported are fastened to the top of the plates 1 and the inner contour of which is not made flush with that of the plate 1, but set back so that the upper edge T (Fig. 4) of the jig plate 1 will mark a trim line along the bubble. At the large end of the jig, in front of the wall 4, the contours 7 continue to be curved inwardly to a narrower width D, and at the opposite end, the jig contours, instead of converging to the end, run beyond the end support 2, parallel a suitable distance apart. Along the outside of the liners 8 and spaced from each other on top of the plates 1 are secured wedge boxes 11 in which is movable a wedge 12, whereas to the outside of the end support 3 are mounted wedge blocks 13 provided with retainers 14 for the pressure blocks 15 and 16 which are radially movable by wedges 17. The jig pressure lid 18, at its underside provided with a soft, preferably rubber gasket 19, has attached to it end walls 20 and 21 which have cemented thereon gaskets 22 and 23 respectively, and fit into the half-round bent metal plate 24 overbridging the jig plate halves 1 and against the circularly arranged pressure blocks 15 and 16, respectively. This lid 18 is to be clamped against the plastic sheet B, laid over the liners 8, and draping in its heated and soft condition into the half-round inner contours of the band 24 and the wall 3, by wedges 12 and 17. The distance between the outer faces of the end walls 2 and 4 defines the finish length of the bubble, and the specified contours at the widths $D^1$ and $D^2$, respectively, correspond to the end shapes of the finished bubble, and which are half-circular at front and rear, however, with the exception that the front edge of the bubble is provided at 25 (Fig. 2) with a straight portion which curves into the circular shape. To obtain the desired shape of the bubble at this end, where it must have a streamline fit with an adjoining wind screen (not shown) including a plan parallel center window, a sectional form piece 26 shaped to the inner contour of the bubble is attached to a plate 27 which is swingable about a hinge 28 secured to an angle attached to the end wall 21 of the pressure lid 18. A rod 29 passing through the lid is pivotally attached by a clevis 30 to a bracket 31 on the plate 27 for operating the form piece 26 against the bubble and its surrounding support 4 after the bubble has been expanded to its full extent which is determined by a sighting device in the form of two plates 32 attached to the side walls 5 and provided with apertures crossed by wire 33. The contours and dimensions of the cutout at D in the end wall 3 and of the band 24 both forming "false fronts" are entirely arbitrary and not necessarily semi-circular as shown, but are usually of smaller dimensions than the end shapes of the finished bubble, depending on the longitudinal curvature and front and rear edge contours of the bubble in such a way that after the bubble has been blown almost to its full extent it assumes at both ends the finish contours of the jig. When finally the full expansion of the bubble has been completed as indicated by the sighting device, the circumferential trimming lines at the finish length L as well as those running longitudinally are slightly marked thereon by the surrounding jig contour members.

Of very great importance is rapid manipulation of the heated plastic sheet from the furnace into the jig to avoid temperature changes as much as possible. To accomplish this the plastic sheet, prior to heating, is provided along its edges with registering holes which are to match corresponding holes 36 in the jig. Pins 37 mounted on levers 38 swingable about pivots 39 fixed in the jig plates are easily inserted in the registering holes and serve as auxiliary holders of the sheet until the pressure lid 18 has been clamped against it. Because of the rather soft and flappy condition of the sheet at elevated temperature, it would be awkward to hold the sheet by hand and in addition put the lid on top of, therefore, auxiliary fastening independent of handling the lid eliminates the risk of complicating the preparation of the hot sheet for blowing and saves personnel and cost. Usually the lid, the weight of which is counterbalanced, is supported by a cable trained over a pulley. For operating the jig an air inlet 40 and an air outlet 41 controlled by a valve 42 and 43, respectively, are provided.

Figure 3:
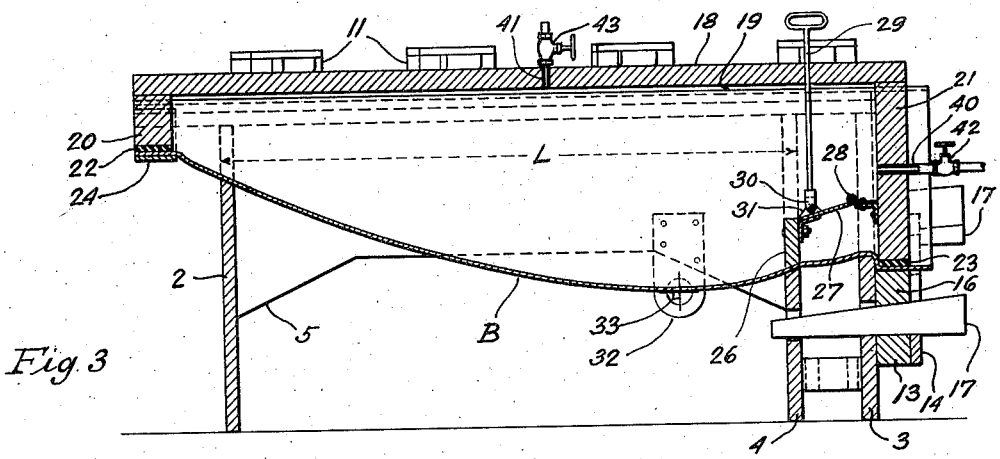
Figure 3 is a cross-sectional longitudinal view taken on line III—III of Figure 1.
Figure 5:
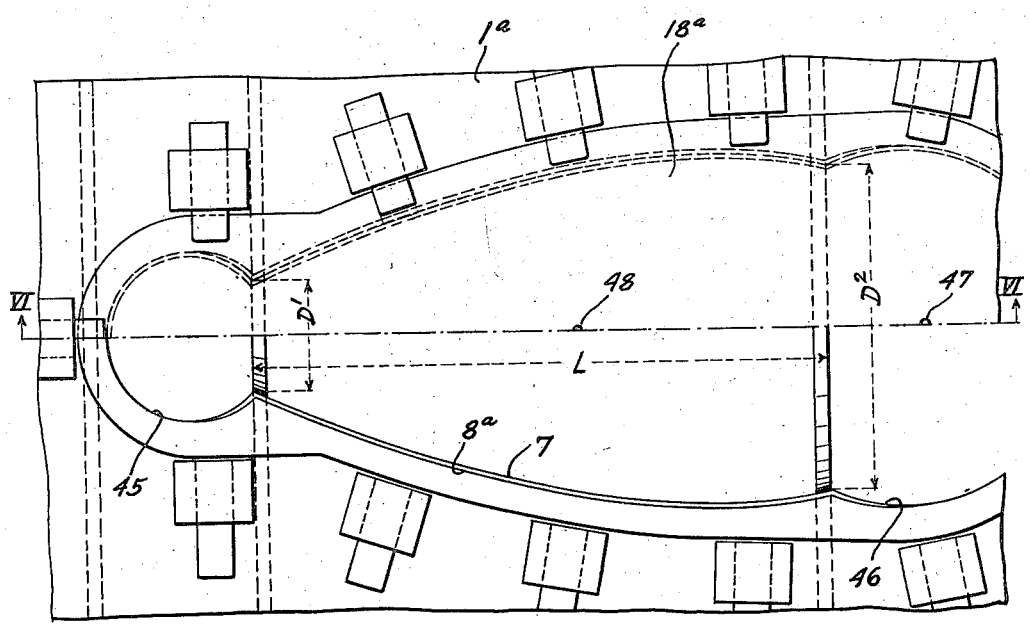
Figure 5 is a fragmentary plan view, similar to Figure 2, of a modification of the invention.
Figure 6:
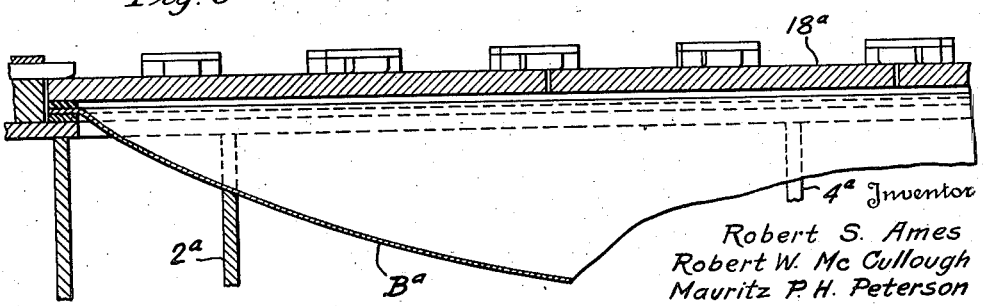
Figure 6 is a fragmentary longitudinal cross-sectional view taken on line VI—VI of Figure 5.

A modified and simpler construction of the invention illustrated in Figures 5 and 6 provides a jig plate $1^a$ closed at both ends in combination with a pressurelid $18^a$ which is entirely flat and without end walls. Instead, the curvatures 7 of the jig plate $1^a$ provided with a complementary liner $8^a$ are connected at both ends of the finish length L of the bubble by preferably circular extensions 45 and 46 which are of larger diameter than the width where they join the curve 7 and are providing a continuously closed contour of the jig. Thus when pressure is applied to the plastic sheet when in hot condition, sufficient material is available for blowing the bubble to the desired size defined by cutouts $D^1$ and $D^2$ in the jig supports $2^a$ and $4^a$, respectively. The pressure lid $18^a$ is provided with an air inlet 47 and outlet 48 similar in principle as described before and shown in Figure 3. All other devices for operating the jig in its modified form are quite similar to those already described and therefore do not need to be repeated here.

The advantages of the modified construction lies in its greater simplicity, but against which weighs the disadvantage that a greater sheet length is required to cover the jig opening resulting in greater waste of materials. To this must be added that plastic sheets are obtainable only up to a certain maximum length which determines whether the one or the other jig construction should be employed.

Even though it is believed the operation of the apparatus or jig will be apparent from the foregoing, a brief review thereof will now be made for the purposes of summary and amplification.

The particular advantage in free blowing a bubble, that is, without the use of a fully surrounding male or female die or both, lies in the fact that the entire surface of the bubble not covered by the frame fastening it to a vehicle is out of contact with any part of the apparatus and, therefore, will be entirely free from any marks and will have perfect optical qualities. The procedure in blowing a bubble is as follows:

The plastic sheet is first provided with a number of holes matching corresponding holes in the jig. Thereafter the sheet is uniformly heated in a furnace to a temperature of from about 250° to 350° F., placed in sagging condition over the jig and secured in its place by registering pins. The pressure lid provided with a sealing gasket is then pressed airtight against the sheet by wedges, whereupon compressed air is admitted between lid and sheet to blow and expand the sheet until it appears as a bubble at its greatest height in the sighting device. The bubble thus is formed into a completely half round cross-sectional shape except where it is formed by special means as described above, and into a longitudinal contour corresponding to that of the jig. To prevent further expanding the bubble and to effect cooling, the release valve 42 is now opened while air is still admitted through inlet 40 to effect cooling circulation and to prevent deformation. The trimming lines are thereby marked on the bubble while in the jig by slight pressure against the surrounding jig contours determining the shape along the edges of the finished bubble.

It will be recognized that the objects of the invention of producing a correctly shaped bubble without marks by free blowing has been achieved. Due to the fact that the finish length portion of the bubble is completely formed by expansion under air pressure and not restricted at the ends by clamping before blowing begins, a perfectly shaped bubble can be obtained. Undesirable checking or bulging at the ends of the bubble are substantially completely absent in a product made by such a jig construction. The optical properties of a bubble so obtained are excellent since no marks of any kind mar the surface, whereas simultaneously, its production cost, as well as that of the jig are reduced considerably with the additional advantage that imperfect pieces are practically eliminated. This method of blowing bubbles is not necessarily restricted to half-circular cross-sections but may be applied for obtaining cross-section of less or greater than a half circle, depending on the blowing pressure applied.

It is to be understood that the invention can be practiced in either one form described or in a combination of both, however, it is believed that the first described construction is the most advantageous since a shorter sheet length is required. The material used for the jig is preferably a synthetic, smooth surface, heat resistant material, however, any other suitable material may be employed.

While in accordance with the patent statutes the two best known embodiments of the invention have been illustrated and described in detail, it is to be particularly understood that the invention is not limited thereto or thereby, but that the inventive scope is defined in the appended claims.

We claim:

1. A jig for forming elongated transparent stream-lined canopies for airplanes and the like including frame means having an opening therein, the opening being shaped to the longitudinal contour of the base of the article to be formed, the opening extending at both ends appreciably beyond the trim length of the article to be formed, the extending portions of the opening increasing in transverse dimensions beyond the trim length of the article to be formed, means supporting a sheet of plastic over the opening in the frame means, differential pressure means for moving the sheet through the opening in the frame means, and external gauge means extending transversely of the frame means and positioned at the trim lines for article length against which the sheet is moved just to touch.

2. A jig for forming stream-lined canopies for airplanes and the like including frame means having an opening therein, the opening being shaped to the longitudinal contour of the base of the article to be formed, the opening extending at both ends appreciably beyond the trim length of the article to be formed, means supporting a sheet of plastic over the opening in the frame means, differential pressure means for moving the sheet through the opening in the frame means, and external gauge means extending transversely of the frame means and positioned at the trim lines for article length against which the sheet is moved just to touch.

3. A jig for forming stream-lined canopies for airplanes and the like including frame means having an opening therein, the opening being shaped to the longitudinal contour of the base of the article to be formed, the opening extending at both ends appreciably beyond the trim length of the article to be formed, means supporting a sheet of plastic over the opening in the frame means, differential pressure means for moving the sheet through the opening in the frame means, external gauge means extending transversely of the frame means and positioned at the trim lines for article length against which the sheet is moved just to touch, and means movably mounted in association with the jig for engaging the inside of the article after the main forming of the article is completed to press the article into narrow area contact with the external gauge means.

4. A jig as in claim 1 wherein said support means engage with the plastic sheet at the ends thereof, and said last named means include a form piece positioned within the jig and shaped to the desired internal transverse contour of the article at a trimmed end thereof, and a control member associated with said form piece and extending to a point outside of the jig whereby the form piece can be brought into engagement with the article and force it against the external gauge means to shape the article positively to the desired end contour.

ROBERT S. AMES.
ROBERT W. McCULLOUGH.
MAURITZ P. H. PETERSON.

REFERENCES CITED

The following references are of record in the file of this patent:

UNITED STATES PATENTS

| Number | Name | Date |
|---|---|---|
| 2,123,552 | Helwig | July 12, 1938 |
| 2,142,445 | Helwig | Jan. 3, 1939 |
| 2,357,806 | Borkland | Sept. 12, 1944 |
| 2,365,637 | Helwig | Dec. 19, 1944 |
| 2,367,642 | Helwig | Jan. 16, 1945 |